(12) United States Patent
Afek et al.

(10) Patent No.: US 6,876,655 B1
(45) Date of Patent: Apr. 5, 2005

(54) METHOD FOR ROUTING WITH A CLUE

(75) Inventors: Yehuda Afek, Hod Hasharon (IL);
Anat Bremler-Barr, Holon (IL); Sariel Har-Peled, Tel-Aviv (IL)

(73) Assignee: Ramot at Tel Aviv University Ltd., Tel Aviv (IL)

( * ) Notice: Subject to any disclaimer, the term of this patent is extended or adjusted under 35 U.S.C. 154(b) by 0 days.

(21) Appl. No.: 09/556,173

(22) Filed: Apr. 20, 2000

Related U.S. Application Data

(60) Provisional application No. 60/145,979, filed on Jul. 29, 1999, and provisional application No. 60/130,391, filed on Apr. 22, 1999.

(51) Int. Cl.$^7$ .......................... H04L 12/28; H04L 12/56
(52) U.S. Cl. ........................ 370/392; 370/400
(58) Field of Search ................................ 370/400, 389, 370/392; 709/238

(56) References Cited

U.S. PATENT DOCUMENTS

| | | | | |
|---|---|---|---|---|
| 5,917,820 A | * | 6/1999 | Rekhter | 370/392 |
| 6,295,296 B1 | * | 9/2001 | Tappan | 370/392 |
| 2002/0129086 A1 | * | 9/2002 | Garcia-Luna-Aceves et al. | 709/200 |

OTHER PUBLICATIONS

G. P. Chandranmenon and G. Varghese. Trading Packet Headers for Packet Processing. IEEE/ACM Transactions on Networking, Apr. 1996. p. 149, Figure 6.*

* cited by examiner

*Primary Examiner*—Frank Duong
*Assistant Examiner*—Kevin C. Harper
(74) *Attorney, Agent, or Firm*—Mark M. Friedman

(57) ABSTRACT

A method of routing a data packet from a forwarding router to a downstream router. The data packet header includes an address that includes a bit string. The forwarding router looks up, in a forwarding database, a prefix that best matches the bit string. The forwarding router then attaches to the data packet a clue that is related to the best matching prefix, and forwards the data packet to the downstream router. The downstream router looks up, in a downstream database, and with reference to the clue, another prefix that best matches the bit string. Because the databases of neighboring routers are similar, the clue either directly determines the best matching prefix at the downstream router or provides the downstream router with a good starting point for its lookup.

33 Claims, 7 Drawing Sheets

METHOD FOR ROUTING WITH A CLUE

CROSS REFERENCE TO RELATED APPLICATIONS

This application claims priority benefit to U.S. Provisional Application No. 60/130,391, filed Apr. 22, 1999, and U.S. Provisional Application No. 60/145,979 Jul. 29, 1999.

BACKGROUND OF THE INVENTION

This invention relates to prefix matching in database searches in general, and more particularly to high-speed routing lookups of IP messages traveling across the Internet.

Traffic on the Internet is increasing exponentially. Traffic increase can be traced not only to the increased number of hosts, but also to new applications (e.g., the Web, video conferencing, remote imaging), which have higher bandwidth needs than traditional applications.

One can only expect further increases in users, computers, applications and traffic. The possibility of a global Internet with multiple addresses per user (e.g., each user may have several appliances on the Internet) has necessitated a transition from the older Internet routing protocol (called IPv4, with small 32 bit addresses) to the proposed next generation protocol (called IPv6, with much larger 128 bit addresses).

The increasing traffic demand placed on the network forces two key factors to keep pace: first, the speed of communication links; and second, the rate at which routers can forward messages.

Routers are computers that route packets in the Internet according to the destination address of the packet that is placed in a portion of the packet called a header, very much like automated Post Offices in the postal network.

With the advent of fiber optic links, it is easily and economically possible to increase the speed of communication links. However, improving the speed of communication links is insufficient unless route's forwarding speeds increase proportionately, thus router vendors wish to increase the forwarding performance of their routers.

The two main functions of a router are to lookup destination addresses (address lookup) of the packet and then to send the packet to the right output link (message switching). Fortunately, the problem of message switching is very well understood in recent years because of advances in asynchronous transfer mode (ATM) switching technology, and economical gigabit message switching is quite feasible today. Thus, the major problem that routers face in forwarding an Internet message is known as address lookup.

When a message, carrying its destination address arrives on a certain link of a router, the router consults a Forwarding Table (sometimes also called a Forwarding Database). This is a table in the memory of the router, which lists possible destination addresses and their corresponding output link.

However, it is impossible for each router to store routing information for every possible address on the network. Rather, routers store routing information for partial addresses. Consequently, the packet advances toward its destination by "hopping" from a router to a router until it reaches its final destination.

Internet address consists of a string of bits. The IPv4 uses 32 bit addresses while the expected IPv6 will use 128 bit addresses. A string of bits identical to a partial sequence of the bits of the address, beginning with the first bit of the address, which resides in the entry of the Forwarding Table, is called a prefix.

Routers obtain massive savings in table size by summarizing several address entries by using a single prefix entry.

Unfortunately, the use of prefixes introduces a new dimension to the lookup problem: multiple prefixes with various lengths may match a given address.

If a packet matches multiple prefixes, it is intuitive clear that the packet should be forwarded corresponding to the most specific (longest) prefix that it matches.

When a message arrives, the router must search through its database and retrieve the entry corresponding to the best (longest) matching prefix (BMP) of the destination address and to forward the message accordingly toward its final destination via a router which is "closer" to the destination address.

Current speeds for lookups are quite slow. For example, by using existing routers which utilize hardware assistance for lookups, it can take for a single lookup up to 1 $\mu$s on average and 3 $\mu$s in the worst case.

The longer length of IPv6 addresses as compared to the IPv4 addresses, will only compound the address lookup problems of routers.

It is therefore obvious that speeding up address lookups is a very hot topic that has received considerable attention in recent years. Three major directions were taken:

(1) Better implementations of the data structures and search techniques in the router, mostly software based. (2) Hardware approaches to enable fast lookups with parallelism in the hardware, and (3) Avoiding the lookup process by adding indexing keys, such as labels, and flow identifiers in the packet headers. Being prior art, these approaches will be briefly described:

Data Structures and Algorithms Approach:

This approach is treated in the following references:

K. Sklower. "A tree-based routing table for berkeley unix". Technical report, 1992.

R. Perlman. "Interconnections, Bridges and Routers". Addison-Wesley, 1992.

M. Waldvogel, G. Varghese, J. Turner, and B. Plattner. "Scalable high speed IP routing lookups". In Proc. ACNI SIGCOMM 97, October 1997.

Degermark, A. Brodnik, S. Carlsson, and S. Pink. "Small forwarding table for fast routing lookups". In Proc. ACM SIGCOMM 97, October 1997.

B. Lampson, V. Srinivasan, and G. Varghese. "IP lookups using multi way and multi-column search". In Proc. Infocom 98, March 1998.

The standard IP lookup algorithm currently in use is based on radix trie (or Patricia), see Leffler and Samuel J. et al. "*The Design and implementation of the 4.3BSD UNIX*" Addison-Wesley, 1988, and K. Sklower. 1992.

In this implementation the prefixes are efficiently represented in a trie. A trie is a data structure, that allows us to search for prefixes a bit at a time and to do so incrementally.

A trie consist of a tree of nodes, each node containing a table of pointers. The standard solution for the Ipv4 (e.g., the solution which used in BSD UNIX) uses binary tries, in which each trie node is a table consisting of two pointers.

Scanning the address bit by bit and matching it along a path in the trie perform each address lookup. The worse case cost of an IP lookup is thus O(W) where W is the address length (32 in IPv4, 128 in IPv6). This scheme requires O(N) space, where N is the total number of prefixes in the forwarding table.

The basic approaches to improve this scheme are: (1) Perform a binary search over the possible prefix lengths, see M. Waldvogel et al., 1997. For each test in the binary search a hash table is consulted, requiring to break the prefixes into several hash tables which all together require O(N log W) space.

(2) Go over the address in different jumps, rather then bit by bit, see V. Srinivasan and G. Varghese. "Faster IP lookups using controlled prefix expansion". In Proc. *ACM Sigmetrics 98*, June 1998.

(3) Binary search over the space of N prefixes, requiring O(log 2N), see R. Perlman, 1992. This approach has been improved by relying on the synchronous dynamic random access memory (SDRAM) technology and performing 6-way search resulting in O(log N) steps, see B. Lampson et al., 1998.

(4) Compress the prefixes data structure into the cache, see Degermark et al., 1997, and S. Nilsson and G. Karlsson. "Fast address look-up for Internet routers". In Proc. *IEEE Broadband Communications*98, April 1998.

Patent literature with regard to the increasing speed of IP routing lookups includes: U.S. Pat. No. 6,011,795 to Varghese, et al., U.S. Pat. No. 6,014,659 to Wilkinson III, et al. and U.S. Pat. No. 6,018,524 to Turner, et al.

Hardware Approach:

This approach is shown in the following references:

A. J. McAuley and P. Francis. "Fast routing table lookup using cams". In Proc. *INFOCOM*, pages 1382–1391, March–April 1993.

A. J. McAuley, P. F. Tsuchiya, and D. V. Wilson. "Fast multilevel hierarchical routing table using content-addressable memory". In Proc. *SIGCOMM 95*. January 1995, and in U.S. Pat. No. 5,3816,423 to McAuley.

There are several directions all based on the usage parallelism in the hardware level:

(1) Usage of pipelining to perform several lookups at the same time, see P. Gupta, S. Lin, and N. McKeown. "Routing lookups in hardware at memory access speeds". In Proc. *INFOCOM*, April 1998.

(2) Employ low level hardware parallelism by using content addressable memories (CAMs), see A. J. McAuley et al., 1993 & 1995. In such memories, (like associative memories) the address is compared against all the prefixes in the memory in parallel.

(3) Employing a cache to hold the results of recent lookups. It is possible to achieve a 90% hit rate only by employing a large and very expensive cache based on the CAM technology. See C. Partridge. "Locality and route caches." In NFS Workshop on Internet Statistics Measurement and Analysis, February 1996, and P. Newan, G. Minshall, and L. Huston. "IP switching and gigabit routers." In IEEE *Communications Magazine*, January-1997.

All the hardware solutions suffer from very high costs especially when applied to large backbone routers, and they don't scale easily.

Label Swapping Approach

Motivated by the increased demand for Gigabit routers to carry the ever-growing IP Traffic; there have been recently several suggestions to combine fast packet switching/processing with IP routing. Specifically it is suggested to exploit the cheaper price of bandwidth compared with the price of processing.

The idea is to add some information to the packet header, which helps the routers along the packet path to process the packet, i.e., perform IP lookups much faster.

This direction includes IP-switching. See Newan et al., 1997. TAG-switching, Yakov Rekhter et al., "Tag switching architecture overview". Technical report, IETF, 1996, ftp://ds.internic.net/internet-drafts/draft-rfced-info-rekhter-00.txt, threaded indices, see G. Chandranmenon and G. Varghese. "Trading packet headers for packet processing". In *IEEE Transactions on Networking*, April 1996, and Multiple Protocol Label Switching (MPLS), see R. Callon, P. Doolan, N. Feldman, A. Fredette, and G. Swallow. "A framwork for multiprotocol label switching". Technical report, IETF, November 1997. draft-ietf mpls-framework-02.txt.

Basically, a label is attached to each packet in a flow. Routing decisions are done by one memory reference into a table of labels (similar to virtual circuit (VC) switching in ATM). Each entry in the table contains for the corresponding label, its routing decision and perhaps a new label to attach to the packet.

The main issue in the label swapping methods is how to associate a label to a flow, when is this association made, and whether it may it be aggregated.

Two basic approaches are: traffic based label assignments, and topology based label assignments. In traffic based label assignment, each flow of packets receives a label, similar to VC routing in ATM.

This method introduces setup overhead that delays the first packet of a flow by either a complete round trip or by just one hop in a more sophisticated implementation. In the topology based approach, a label is assigned to each destination or group of destinations (another much more expensive possibility is to assign a label for each source destination pair, like private virtual circuit (PVC) in ATM).

Either of the label approaches does not completely eliminate the need for a full IP lookup. When packets are transferred between different networks (networks that are owned by different companies) an IP Lookup is required to compute new labels in order to resolve label coordination problems.

Both switching methods require additional coordination and communication between routers to distribute and agree on the labels. These methods require a major change in the router protocol and work only in those portions of the network that have implemented them.

Since the number of labels is bounded it is impossible to assign each destination or each flow its own label. Thus, in TAG switching for example, a label is given to a group of destinations and when the packets approach the destination they need to be separated, which requires again a full IP lookup.

According to the prior art which was described above, it is understood that IP address lookup can not be avoided. It is therefore a widely recognized need for an algorithm, that quickly looks up at an IP address and forwards the message to its destination, which would overcome the disadvantages of presently known lookup methods as described above.

SUMMARY OF THE INVENTION

In the present invention we describe an innovative general method for accelerating the computations performed at routers while forwarding packets.

There is provided a method for routing a data packet from a forwarding router to a downstream router comprising the steps of: (a) providing the data packet with a header including an address, the address including at least one bit string; (b) providing the forwarding router with a database including a plurality of prefixes; (c) looking up, via a first data structure in the database of the forwarding router, the prefix that best matches the bit string of the address of the data packet; and, (d) attaching a clue that is related to the best matching prefix to the data packet.

There is provided a method of routing a plurality of data packets from a forwarding router to a downstream router, comprising the steps of: (a) providing each data packet with a header including an address, the address including at least one bit string; (b) providing the forwarding router with a forwarding database including a plurality of prefixes; and (c) for each data packet: (i) looking up, in the forwarding database, the prefix that best matches the bit string of the address of the each data packet, and (ii) attaching to the each data packet a clue that is related to the best matching prefix.

There is provided a method of routing a plurality of data packets from d forwarding routers, d being an integer greater then one, to a downstream router, each data packet being routed from a respective forwarding router to the downstream router, the method comprising the steps of: (a) providing each data packet with a header including an address, the address including at least one bit string; (b) providing each forwarding router with a respective forwarding database including a plurality of prefixes; and (c) for each data packet: (i) looking up, in the respective forwarding database, the prefix that best matches the bit string of the address of the each data packet, and (ii) attaching to the each data packet a clue that is related to the best matching prefix.

There is provided a method of balancing a work load of a set of routers that exchange data packets, each router sending data packets directly only to a subset of the other routers, each data packet including a header that includes a destination address, comprising the steps of: (a) providing each router with a database including a plurality of prefixes; and (b) when a first router sends one of the data packets to a second router: (i) looking up, in the database of the first router, the prefix that best matches the destination address of the one data packet; and (ii) attaching to the one data packet a clue that is related to the best matching prefix instructing the second router to send the one data packet directly to a third router without looking up a best matching prefix.

There is provided a method of routing a plurality of data packets from a forwarding router to a downstream router in a MPLS network, comprising the steps of: (a) providing each data packet with a header including an address, the address including at least one bit string; (b) providing the forwarding router with a forwarding database including a plurality of prefixes; and (c) for each data packet: (i) looking up, in the forwarding database, the prefix that best matches the bit string of the address of the each data packet; (ii) providing data packets having the same best matching prefixes, a label; and (iii) attaching to the each data packet a clue that is related to the best matching prefix.

There is provided a method of routing a plurality of data packets from a forwarding router to a downstream router in a Tag-Switching network, comprising the steps of: (a) providing each data packet with a header including an address, the address including at least one bit string; (b) providing the forwarding router with a forwarding database including a plurality of prefixes; and (c) for each data packet: (i) looking up, in the forwarding database, the prefix that best matches the bit string of the address of the each data packet, (ii) providing data packets having the same best matching prefixes, a tag; and (iii) attaching to the each data packet a clue that is related to the best matching prefix.

During the forwarding process, the router decides on the next hop of each packet by searching a forwarding table with some keys taken from the packet header, e.g., the packet destination address. The basic idea of the present invention relies on the fact that the forwarding tables of near-by routers are similar, and that much of the computation work a router performs on a packet was already done by its upstream neighbor.

Usually, in networks such as the Internet, each forwarding table contains similar aggregated information about the routes in the network. The basic idea is then, that each router adds a "clue" to each packet, providing the downstream router with information obtained during the forwarding computation.

The "clue" is chosen in such a way that the downstream router can perform the forwarding computation, using the clue, much more efficiently, usually in one memory access.

The method we describe in the present invention is called distributed IP-lookup, which is shown schematically in FIG. 1 to which reference is now made.

The basic idea of distributed IP-lookup is that a router R1 sending a packet to router R2, adds a clue to the packet containing information on what it has learned on this packet while processing it, i.e., while processing the packet header. Router R2 uses the clue to start processing the packet header at the point R1 ended.

To this end, Router R2 maintains a table of clues it may receive from R1 containing for each clue information that may help R2 to more efficiently process the packet.

The clue helps router R2 to perform faster IP-lookup, after which R2 sends the packet to router R3 again with a clue on what R2 has learned about this packet. The clue that a router includes is based only on what it has learned about the packet and is independent of the clue that came with that packet from the previous router.

In spite the fact that a router may disregard a clue, or may not include a clue on the outgoing packets, the scheme still works albeit not as efficient as possible.

One of the most natural clues for IP routers, and the one which is considered in detail in the embodiments of the present invention, is the best matching prefix that a router found in its database for the packet destination address.

Being a prefix of the packet destination address, the clue is easily encoded by 5 bits (IPv4) defining the part of the address which is the clue. Thus, the set of possible clues from router R1 to router R2 are the prefixes in R1's forwarding table for which R2 is the next hop.

Router R2 can obtain this information in one of two ways: (1) on the fly, as clues arrive or, (2) when the routing tables are being computed (by e.g., Open Shortest Path First (OSPF), or Border Gateway Protocol (BGP)).

The information of what a router may gain from an incoming clue may either be computed for each clue when the first instant of that clue arrives, or as before, together with the forwarding tables computation. Either way, there is no need for any real time extra processing, i.e., there is no work in a new connection setup, the processing gain is achieved even if only one packet is sent in this flow (e.g., User Datagram Protocol (UTDP)).

No round trip delays are incurred and no label coordination between routers, or random indices selection by the source is necessary. The extra space necessary for the clues hash table (as we will show one clue table is sufficient for all incoming links) is pessimistically about 60,000 entries (for large routers) with an average of nine bytes for each clue resulting in a total of about 540 Kbyte.

Another feature of the invented clue system is its robustness, i.e., even if neighboring routers are slightly uncoordinated the clues they send each other cannot cause any confusion.

While distributed IP lookups is a natural and economical extension of IP forwarding tables, its main disadvantage when compared with TAG-switching or threaded indices is that it does not guarantee O(1) lookup cost. However, the new scheme requires fewer bits at the header, and provides a much simpler implementation.

Furthermore, as our preliminary empirical tests show, the average number of memory accesses in our scheme is close to 1 (1.05 in the unfavorable case). I.e., the performances of our scheme are very close to that of IP/TAG-switching.

The Distributed IP lookup scheme divides the cost of processing a header among the routers along the packet path. Each router starts the IP lookup where its predecessor stopped.

In FIGS. 2A and 2B to which reference is now made, we show (speculative) graphs of the length of the packet best matching prefix along a path from the source to the destination and its derivative which depicts the expected amount of work according to the method of the invention by routers along the packet path, respectively.

As shown in FIG. 2A, best matching prefix of an address becomes longer as we approach the destination, and the amount of work of each router in prior art methods increases accordingly. In the distributed IP look up method, each router does not repeat the effort of his upstream (preceding) routers, rather, its work is limited to the amount invested for finding an extendend BMP.

As can be further seen in FIG. 2B, we expect the heavily loaded routers at the heart of the Internet backbone to be the least loaded by the method of the present invention.

In contrast to the label swapping methods, the invented approach which uses the destination address plus a clue on each packet, does not introduce any setup overhead, or routers coordination.

The clue helps to perform the lookup much faster, sometimes as fast as in the label swapping methods. One may argue that label swapping approaches are faster since they switch the packet in O(1) memory references. However, if we consider the IP lookups they require at the boundaries, and at intermediate gates, then along the entire packet path our method may often incur less processing.

Moreover, we believe that distributed IP lookup can be easily implemented in existing routers, as it is a natural extension of IP routing and requires fewer changes.

Furthermore, the distributed IP lookup is easy to integrate into heterogeneous networks. Even if only few of the routers use the scheme it already pays off and mixing routes that support with routers that do not support the method does not disturb the network operation.

No trust problem is created by the method since the prefixes router R2 learns from R1 are those prefixes that R1 has for the network of R2, or for destinations that are beyond R2 (i.e., R2 learns what R1 knows about R2).

The invented method does not require any coordination between the routers and works well in heterogeneous networks even if only partially deployed.

In the present invention we concentrate on different embodiments of distributed IP lookup and its implications. However, we believe the idea of a clue in which one router shares what it has learned from a packet with succeeding routers may have other generalizations and applications in different domains.

For example, the idea of the present invention can be extended to handle Quality of Service (QoS) classification. Classification in QoS is done according to several parameters (i.e. destination address, source address, destination port, source port, protocol).

The method can also be used to balance the work-load between routers in the network. In particular, moving the load of doing IP-Lookup from the core routers to the peripheral routers.

It is the object of the invention to represent a method for IP-lookup which considerably speeds-up the standard IP lookup process, with performances that are close to those provided by TAG-switching and other label switching methods.

It is another object of the present invention to represent a simple method which is a natural extension of the IP protocol hence easily deployed in current IP networks.

It is yet, another object of the invention to close the gap between IP routing and Label switching.

Other objects of the invention will become apparent upon reading the following description taken in conjunction with the accompanying drawings.

SHORT DESCRIPTION OF THE DRAWINGS

DETAILED DESCRIPTION OF PREFERRED EMBODIMENTS

The present embodiments herein are not intended to be exhaustive and to limit in any way the scope of the invention, rather they are used as examples for the clarification of the invention and for enabling of other skilled in the art to utilize its teaching.

Distributed IP Lookups

General Considerations

In general, upon receiving an IP packet, an IP router looks up in its forwarding table for the longest prefix that matches the destination address of that packet.

With each prefix in its forwarding table the router keeps the next hop on the route to the destination, for all the packets for which this prefix is the longest match. In what follows we concentrate on the case in which the clue piggybacked on an IP packet sent from router R1 to the next router R2 is the best matching prefix that R1 found for that packet destination address.

Henceforth, the word clue stands for the longest prefix match that router R1 found for the packet destination address and send to R2. The word clue is used interchangeably for a clue; the string representing it, and the vertex in a trie that contains this string.

Since the clue is a prefix of the packet destination address, it can be encoded by 5 bits pointer into the destination address (IPv4). The five bits simply represent the number of leading bits of the destination address that represent the prefix. For example, for the address 125.7.19.123 and 5 bits value of 16 represent the clue 125.7.

Figure 1:
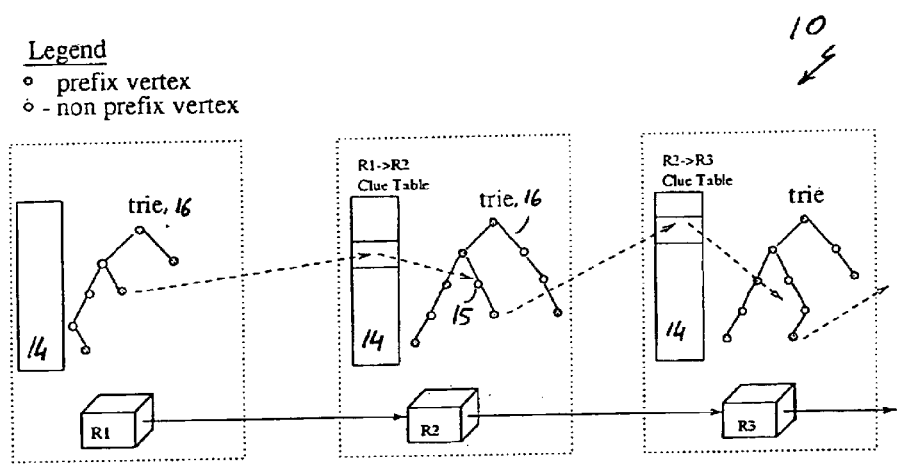
FIG. 1 shows the concept of distributed IP lookup.
Figure 2A:
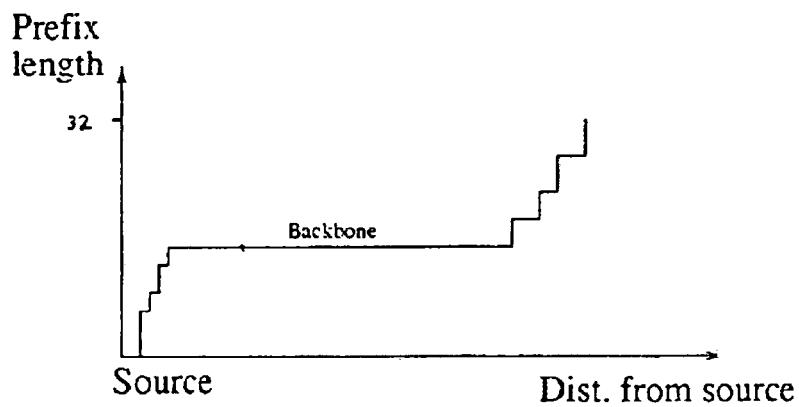
FIG. 2A shows a schematic graph of the length of prefixes of routers vs. their distance from destination.
Figure 2B:
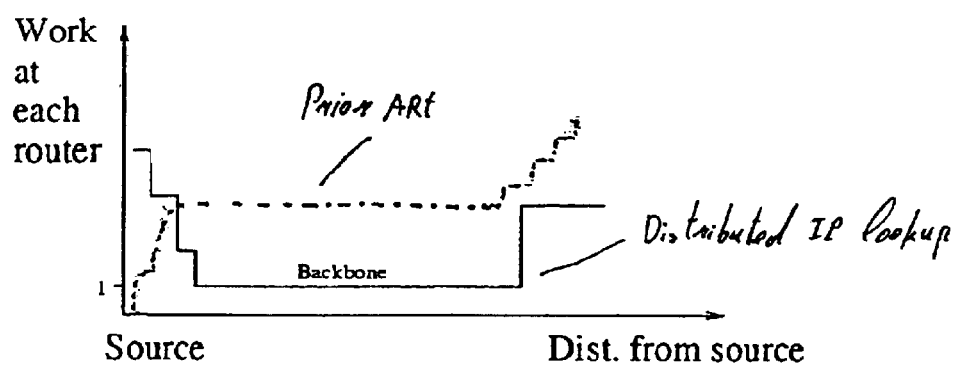
FIG. 2B shows schematic graphs of the work load of routers vs. their distance from destination according to prior art and according to the distributed IP lookup.

In embodiment 10 of the invention shown in FIG. 1, each router maintains a clues' hash table 14 of all the clues it may receive from its neighbors. For each clue, table 14 contains information that helps the router to quickly find the longest prefix of the packet destination and then to forward the packet to its downstream router by consulting with a forwarding table (not shown).

The information provided by a clue is essentially one of two types: either that the clue directly implies the longest prefix match of the packet destination at this router, or that a search for a longer prefix should be performed starting in a location (a vertex) 15 in a trie 16 pointed at by the clue.

The main considerations are: how useful and beneficial is the clue to the router receiving it, and what are the costs associated with the method. The cost of carrying the clue on the packet, and the cost of maintaining the clues hash table. The main effect of our method is that the longest prefix match computation is now divided (distributed) among several routers along the IP packet path.

The premise of the technique is that the forwarding tables at neighboring routers are similar and thus in many cases the best matching prefix (BMP) found in one router is either also the BMP that is found in the next router or very close to it. There are several reasons why forwarding tables at neighboring routers are similar.

One reason is simply that the computation of a forwarding table at a router is based on the forwarding tables of its neighbors and thus is strongly related to these tables.

Furthermore, at certain levels of the Internet routing algorithms BGP aggregation of prefixes is discouraged, see B. Halabi. In *Internet Routing Architectures*. New Riders Publishing, Cisco Press, 1997. (Under BGP a router may not aggregate prefixes which it does not administer to avoid the creation of what is called "black holes"). Another reason to discourage aggregation is to avoid huge changes in the routing tables following a topological change. That is, aggregation is done inside some domains, Autonomous Systems (AS), and at the borders of the AS's.

Once the prefixes of networks inside an AS are outside of the AS they are not aggregated anymore with any other prefixes. However, there are other policies carried out by BGP that may cause dissimilarities between neighboring forwarding tables. These are policies by which a BGP router tries to hide information from neighbors for policing reasons.

How to Benefit from a Clue

To understand how beneficial a clue is to the router receiving it, we need to analyze the relations between the tries of the neighboring routers.

Figure 3:
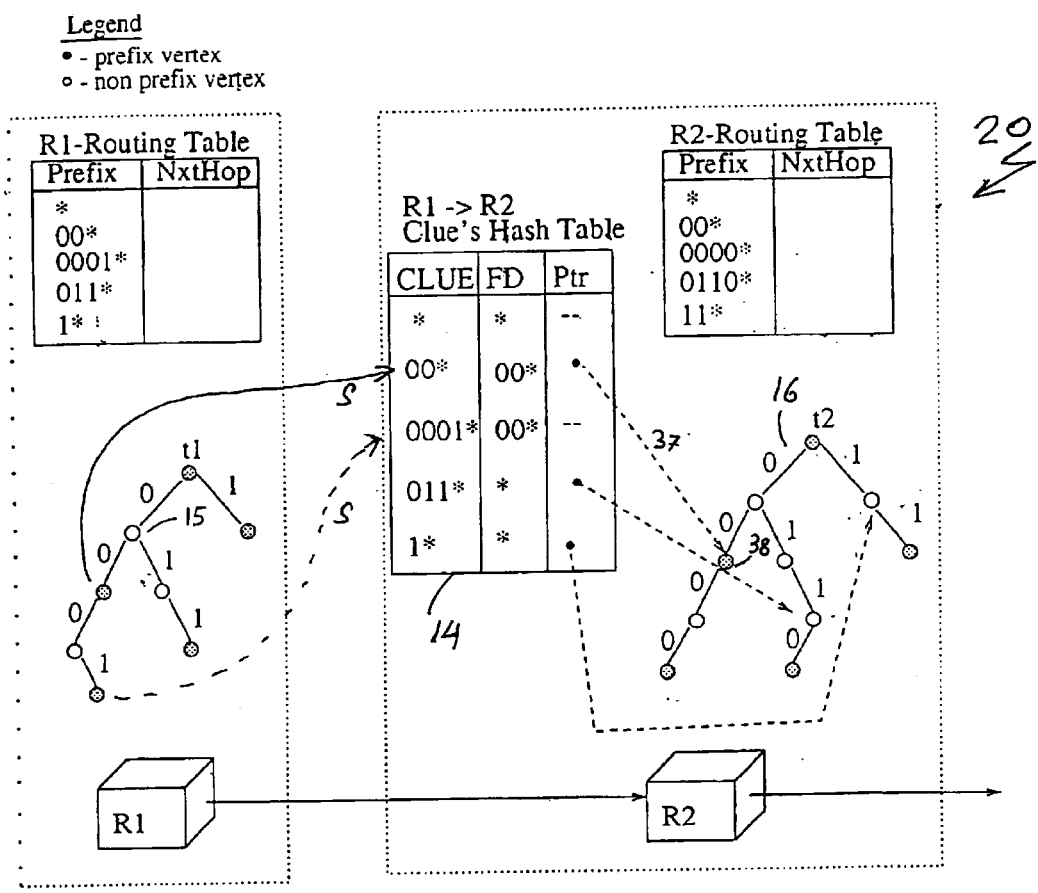
FIG. 3 shows a "simple" method of the present invention.

A trie data structure 16, shown in FIG. 3, is a binary tree data structure that represents all the prefixes in a router's forwarding table. Each vertex 15, in a trie represents a binary string in the natural way: The root of the tree represents the empty string.

Each edge going to the left from a vertex represents 0, and an edge going to the right represents 1. The binary string associated with a vertex 15 in the trie 16 is the sequence of bits on the edge along the path from the root of the tree to that vertex.

Not all the vertices in the tree represent prefixes, those that do are specially marked so. Any unmarked (non prefix) vertex in the tree that has no marked descendants is removed from the trie. Thus, all the leaves of a trie are marked.

In a common implementation of the trie data structure, called Patricia, all the internal unmarked (non-prefix) vertices that have only one child, are contracted, thus any internal vertex is either marked or has two child vertices.

As we will see, there are several cases in which router R2 knows by the clue alone what is the BMP of the received packet. In such cases we store in the clue's hash table 14 either one of the following: the packet BMP, a pointer to that prefix entry in the forwarding table, or simply the next hop associated with this prefix in the routing table. Which of the above is placed in the hash table depends on the implementation and whether other decisions besides the next hop are necessary with regard to this packet.

Henceforth we will denote such a value FD (final decision), which stands for either one of the above three options. Notice that placing the next hop in the clues table requires updating the table upon changes in the routes.

Next we present two different ways, Simple and Advance, in which a router receiving a clue s may use it Simple is more straightforward, requires less pre-computations but does not take full advantage of the clue. Advance, requires a little more pre-computation and takes full advantage of the clue.

The expected lookup time of Advance is smaller than that of Simple (amortizing over different possible as headers). Either method significantly reduces the expected processing time at the routers.

The Simple Method

In this embodiment 20, shown in FIG. 3, upon receiving a clue s router R2 tries to find a longer prefix for the packet address only if in its trie vertex s has any descendants (e.g. for s=00*). If however vertex s has no descendants or does not exist in the trie (e.g. when s=0001*), then router R2 finds in the entry of s in the clues table 14, the best matching prefix that could possibly be found in its trie.

In this method we keep with each clue in the hash table two fields, a pointer Ptr, and a final decision FD. If Ptr is not set to a special value, called empty then Ptr points 37 to the location (vertex) 38 in the current trie 16 that corresponds to the clue and from which the search for a longer matching prefix should continue. On the other hand, if Ptr is empty then no longer matching prefix may be found in this router and the FD field contains already the best matching prefix for the corresponding packet (or some other final decision as discussed before).

When Ptr is empty the best matching prefix for the packet is the least ancestor of s in the trie 16 of R2 which is also a prefix (usually, but not necessarily, that will be vertex s by itself).

Upon receiving a packet with clue s, router R2 checks the Ptr field associated with s.

If Ptr is not empty then a search for a longer prefix of the packet destination continues from the location pointed to by Ptr. How the search is continued depends on the implementation of the trie used at this router. It can be a Patricia implementation, or one of the advanced methods suggested by M. Waldvogel et al., 1997, B. Lampson et al., 1998 and V. Srinivasan et al., 1998.

If the search for a longer prefix fails, then the FD field contains the best matching prefix that can possibly be obtained, which is as before the least ancestor of s which is a prefix in R2.

The Advance Method

Figure 4:
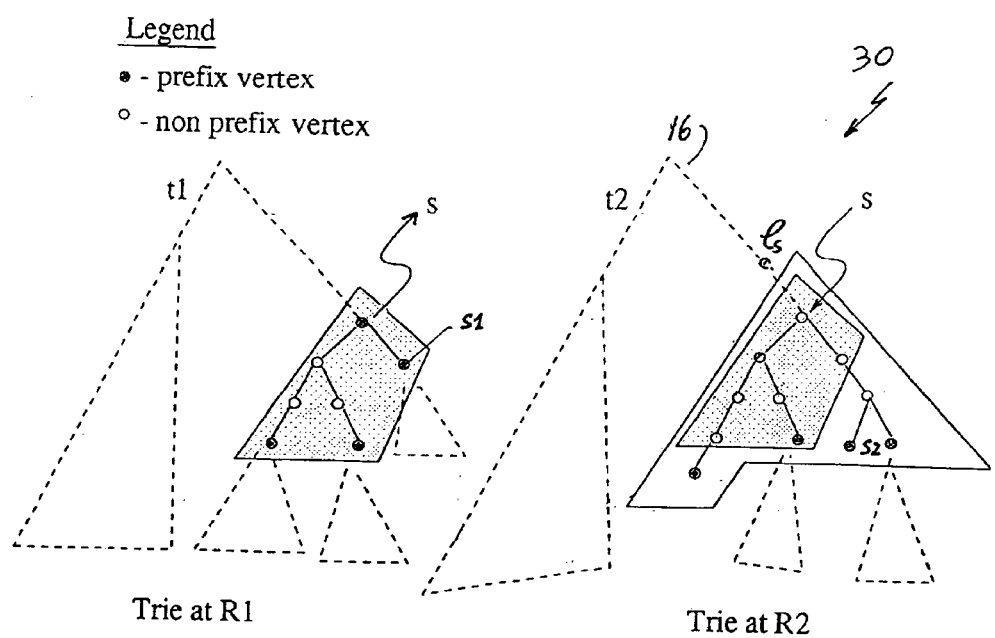
FIG. 4 shows an "advanced" method of the present invention.

In this embodiment 30, shown in FIG. 4, we discover and pre-compute several more cases in which it is not necessary to continue the search for a longer prefix in R2 even though the vertex corresponding to clue s has descendants in the trie of R2.

The basic argument underlying the Advance method is:
Argument 1: Let s be the prefix sent as a clue from R1 to R2 on a packet whose destination address is dest. Let ti denote the trie data structure at router Ri. If on any path going down from s in t2 we encounter a prefix of R1 before or at the same time that me encounter the first prefix of R2, then no prefix of dest longer than s can be found in R2.

Proof for Argument 1 is shown in FIG. 4, where any path from s to a prefix in t2 goes through a vertex that is a prefix in t1. If the prefix s2 found in R2 is longer than (an extension of) s, then by the conditions of the argument, there must be a prefix s1 on the path from s to s2 in the trie of R1, and R1 should have found this longer prefix rather than s, contradicting the fact that s is the BMP at R1.

Figure 5:
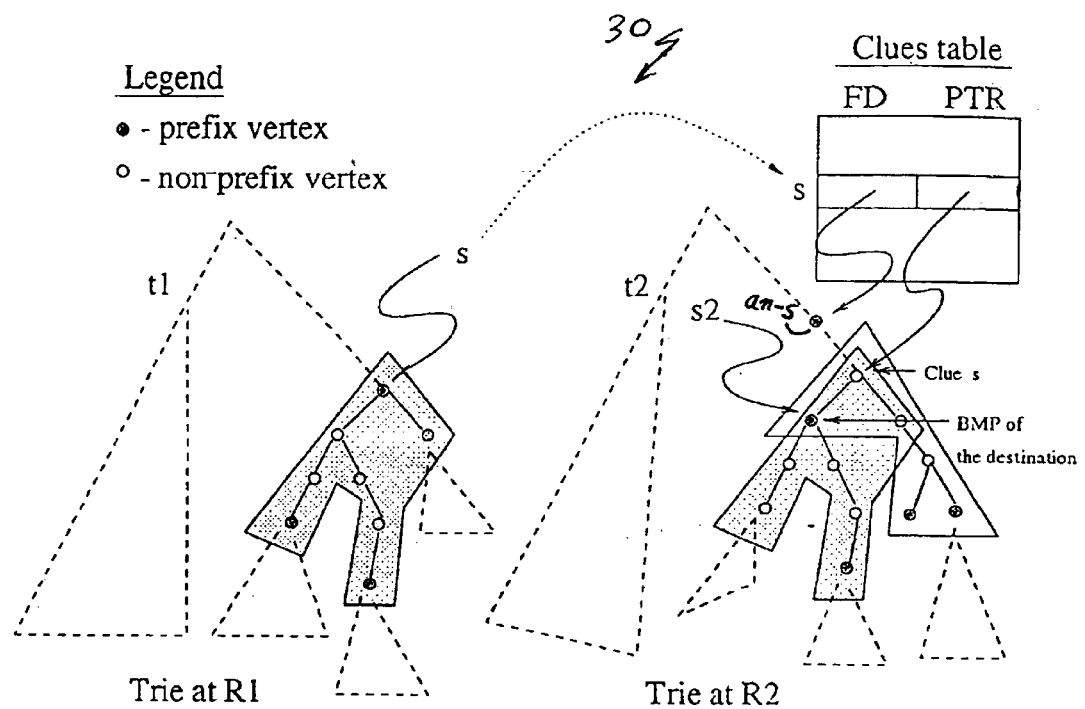
FIG. 5 shows a variant of the "advanced" method of the present invention.

We farther argue that only if the inverse of the condition of argument 1 is satisfied, then the lookup for a longer than s prefix should continue at R2 as shown in FIG. 5.

I.e., only if there is at least one prefix, s2, extending s in the trie of R2 such that no prefix on the path from s to s2 is also a prefix in the trie of R1 (including s2 itself, i.e., neither s2 is a prefix in R1), then a lookup for a longer prefix should continue in R2 (starting from s). In any other case no lookup is necessary in R2, the clue's hash table contains the final result for the lookup at R2.

Let us go over all the possible cases in the Advance method in detail:

Case 1: s∉R2's trie: I.e., there is no prefix vertex in the trie of router R2 that corresponds to the clue s (as shown in FIG. 5). In this case the BMP of s, and hence of dest, in the trie of R2 is the least ancestor of s in R2's trie, which is marked. Denote this ancestor as an-s. This ancestor may be computed off line when the routing tables are setup. Hence, in this case we place in the hash table entry of clue s either a pointer to the entry in R2's routing table that corresponds to an-s, or simply the next hop that is associated with an-s.

Notice however that this case means that the prefix found in a later router is shorter than a prefix found in an earlier router. Thus, it is not expected to often show up when routing packets in the Internet.

Case 2: argument 1 is satisfied: This case is depicted in FIG. 4. Let in this case ls (not shown) be the longest prefix of s which is a prefix in R2's trie. If s is also a prefix in t2 then ls equals s. Otherwise, ls is the least ancestor of vertex s in R2's trie which is also a prefix in R2 (i.e., ls is the BMP of s in t2). In either case ls or the information associated with ls, is placed in the FD field in the table, This prefix may be computed off line when the routing tables are being constructed.

Case 3: The inverse of Argument 1 holds: In this case there is a set S of prefixes in t2 such that there is no prefix s1 in t1 longer than s and shorter or equal to any s2∈S. See FIG. 5 for an example. This is the only case in which the search for the BMP should continue at R2.

In case 3 a search for a longer prefix that matches dest is continued from the vertex corresponding to s in trie t2. There are two issues that have to be addressed in order to complete this search, first what efficient ways are there to perform the continued search, and second what should be done in case the search fails and no prefix of dest longer than s is found in t2.

A straightforward approach to perform the search is to continue linearly from the clue s along a path in t2. Notice however, that the search can stop as soon as it reaches a vertex for which Argument 1 holds. There are better options than a bit by bit scan from s, such as applying one of the techniques suggested by M. Waldvogel et al., 1997, B. Lampson et al., 1998 and V. Srinivasan et al., 1998.

Constructing the Clues' Hash Table

There are two basic approaches for the construction of the clues hash table (for both the Simple and the Advance methods). One is by pre-processing that is carried out during the construction of the routing tables. The second approach, which we found more attractive, is by learning the clues hash table and its fields on the fly, while the network is operating.

Let us start with the latter approach. Before we proceed we point out that the hash table could be implemented using the SDRAM technology in which each cache line is of size 32 bytes. In that case it is possible to store two hash table entries in one cache line (see below). Notice that the hash table is expected to change very rarely and thus a perfect and efficient hashing function is feasible.

Clues Hash Table Fields

The same fields that were used in the Simple method, FD and Ptr are used in the Advance method, in a similar way. If the search for a prefix of dest that is longer than s (case 3) fails then there are two possibilities:

Either s is also a prefix in t2 and then s is the desired BMP, or the least prefix that is an ancestor of s in t2 should be returned as the BMP of dest in t2. Field FD contains the BMP that should be returned in case the search fails (or the FD could contain the next hop which is associated with this BMP).

For cases 1 and 2 above the pointer field is left empty and the FD field contains the desired value, as described in the case analysis.

Clues Hash Table Space Requirements

A pessimistic bound on the clues hash table size assumes that the number of entries in the hash table is about the same as the number of entries in the routing table of a large router (60,000), and that each entry requires the maximum space of three 5 bytes fields, FD, Ptr, and the clue value.

However, in the Advance method only clues for which Argument 1 does not hold require the Ptr field. The empirical tests show that the fraction of these entries is less than 10%.

Altogether we get about 500K–600 K byte. This size does not even double the space requirements of the fast memories in the current routers. Furthermore, parts of the clues hash table can be cached and placed into the cache only if touched recently. As mentioned above the table could be placed in a SDRAM cache in which each line is 32 bytes long and in one memory reference the whole record of two clues is fetched.

Learning and Indexing the Clues Table

In this approach a router R2 (in either Simple or Advance) starts fresh with an empty clues hash table. Each new clue that arrives the router detects that the clue is new and inserts it into the hash table.

There are two techniques to implement this approach, one of which avoids the hashing all together and thus may farther reduce the costs associated with processing a packet.

In either of the following two learning techniques, we use a field in the entry of each clue to store the value of the clue itself (which exists any how in hash tables).

In this way, whenever we go to an entry in the table it is possible to check (in one assembly instruction, or in hardware) that the entry we reached indeed corresponds to the clue at hand.

The Indexing Technique

This learning technique avoids the hashing by associating with each clue that may be sent from R1 to R2 a fixed index and consuming another 16 bits in the packet header. Each router R1 sequentially enumerates the clues it may send to R2, $\{1, 2, \ldots, M\}$.

With each IP packet it forwards to R2, R1 includes a clue (encoded as before by 5 bits), and the clue's index (16 bits, assuming there will be at most 64K clues from R1 to R2).

R2, upon receiving the clue s with index ind(s) goes to entry ind(s) in its sequential clues table. If string s is found in that entry, the processing continues as described above. However, if s does not match the clue that is associated with entry ind(s), R2 updates this entry with s, the new clue (overwriting what ever was there before). At the same time R2 processes the values that should be given to the fields Ptr and FD.

Notice that the indexing technique is inherently robust while still not requiring any pre-synchronization between the routers or pre-computation. Furthermore, by avoiding the hash function the packet processing time is farther reduced.

Another advantage is that the routers don't have to send the set of potential clues to their neighbors each time the routing tables are updated. The disadvantages of this method is that it requires 16 additional bits at the packet header, however, a smaller clues table is needed by employing standard caching techniques.

Learning the Hash Table:

Here we trade the 16 bits required by the indexing technique with the usage of the hash function. Here, the hashing function is applied to the clue s that R1 sent to R2. Then, s is compared against the clue associated with the hash table entry that was computed. If they match (again a check that can be done very fast in hardware or one assembly instruction) the processing continues as described before.

If however the entry's clue does not match s or no such entry was prepared before, the computed entry is updated as in the indexing technique.

The advantages of this technique are as before, no pre-processing or routers coordination is necessary. Furthermore, here we use only 5 bits in each packet header. The technique is robust and adaptive to new clues.

By using cacheing techniques the method can be made even more efficient and adaptive while consuming less space. The disadvantage compared with the indexing technique is the usage of a hash function.

Pre-Processing Construction of the Clues Hash Table

The key idea here is that the routers will use the information they exchange in the routing algorithm (that constructs and updates the routing tables) to construct and update the clues table. Thus the actual implementation is highly dependent on the specific routing algorithm that is used, i.e., whether it is OSPF, or BGP, or both.

Combining Clues' Tables of Several Neighbors:

A router that has several neighboring routers usually has a processor at each port that connects it with a neighboring router. In this case the hash table for each neighboring router is placed at the port. A packet arriving at the port first goes through the clues hash table. Then, the packet with the output of the clues hash table is forwarded to the switch or the routing point, depending on the specific implementation of the router/switch.

A router that has several neighboring routers, but all its hashing tables are located in the same memory, (or several routers are connected to the same port and they all share the same clues hash tables at the port), may either treat the table with respect to each neighbor separately, or take the union of the clues it may receive from all the neighbors together.

In the first possibility we end up with several (as the number of neighboring routers) hash tables in one huge table, which is not space efficient. However, in this case we can take full advantage of the Advance method.

In the second possibility, when we take the union of all the clues, the three cases mentioned above should be checked much more carefully. It might be that clue s falls into one category if it comes from one neighboring router and into a different category if it comes from another neighboring router.

Specifically, for Argument 1 to apply for clue s in this case, it must hold for clue s with respect to all the neighboring routers that share the clues' table. There are two other possibilities to preserve the small size of the clues' table with several neighboring routers:

Bit Map: Since a clue provides one of two possibilities, either it directly implies the BMP, or to continue the search, we may add to the common hash table of several neighboring routers a bit map of size d, where d is the number of neighboring routers.

Each bit in the bitmap table is a lookup flag for the receiving router whether to continue looking up the best matching prefix of the address of a data packet arriving from a particular router, or to leave it with its prior BMP. Notice that if the clue implies the BMP for several routers, then it implies the same BMP to all of them. For each clue arriving from neighboring router j we first examine the j's bit and then decide how to proceed.

Sub-Tables:

Here we maintain several tables, one with the clues common to all the routers and for which the behavior with regard to all neighbors is the same, and then a specific table for each neighbor.

An arriving clue has to be looked in both the common table and in the specific table of the router from which the clue came. Depending on where the clue was found and with what values, the processing of the lookup continues.

Variations and Further Improvements

Integrating Clue Routing with MPLS and Tag-Switching

In one of MPLS (Multi Protocol Label Switching) variants, that concerning topology (control) based label assignments, a label is bound to a prefix and all the packets whose best matching prefix (BMP) is the same, carry the same label and are switched using this label.

See E. Rosen, A. Viswanathan, and R. Callon, "Multiprotocol label switching architecture", in *tech. rep., IETF*, 1999. draft-ietf-mpls-arch-05.txt). The same technique is used in Tag-Switching, and hence all that is mention below for MPLS is valid also to Tag-Switching.

Figure 7:
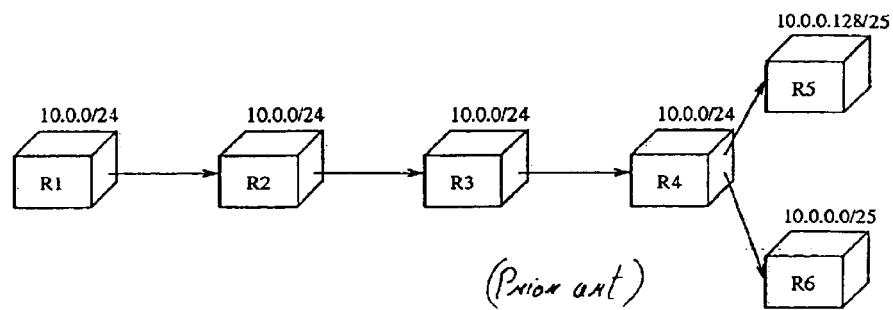
FIG. 7 (prior art) shows the integrating of clue routing with MPLS and Tag-Switching.

When such a stream of packets arrives at a router whose forwarding table contains one or more prefixes that extend the prefix that was bound to this label, this router has to perform an IP-lookup on the packet destination address to decide on which outgoing port and with which new label to forward the packets in the stream as shown in FIG. 7. This is the point where the distributed IP-lookup method can be combined with MPLS.

In FIG. 7 an aggregation point (Router R4) in MPLS is shown, in which router R4 has to perform IP-lookup for packets arriving from R3 with the label that is associated with the prefix 10.0.0/24 (/24 means that this prefix is 24 bits long).

Notice that each label in MPLS (control based) is associated with a clue in distributed IP-lookup (since the label is associated with a specific prefix). I.e., each label implies the clue that would go with the corresponding packet.

Hence, the label can be used as an efficient indexing into the clue table, thus eliminating the hash function in this combination. Therefore, the downstream MPLS router that performs IP-lookup (e.g., router R4 in FIG. 7) on this packet destination address would use the clue associated with the label to considerably expedite the lookup process (since the router would use the clue to efficiently perform the lookup as described in the previous sections).

BGP Over OSPF and Other Considerations

In the Internet today it is often the case that a packet is sent from one BGP router to another over either an Autonomous System (AS) that internally uses OSPF routers or over a different network such as an ATM network. We show the distributed IP lookup scheme is still useful in that scenario.

If an IP packet in a router has to go through its forwarding table twice, i.e., the first BMP the router finds direct the packet to a next hop which is not its immediate neighbor (no interface port is associated with this BMP).

In this case it performs another IP lookup for the BMP of the IP address of the next hop. (B. Halabi, 1997). In such case, the clue it places on the packet is still the first BMP the router finds, since any successive router starts by looking for the BMP of the packet destination address. In some cases, it might be beneficial to place both BMPs on the packet.

Integration with Existing Routers

The scheme of the present invention is easily integrated into a heterogeneous IP network that consists of different IP routers. Moreover, the information one router needs from its neighboring router is expected to be harmless. There are several reasons for that:

1. No coordination between neighboring routers is necessary. Using the Simple method with a hash table for the clues and learning the table on the fly requires no coordination between neighboring routers at all, not in the pre-computation stage and not in real-time when the flow of packets goes through. The most coordination that may be required is in the Advance method with indexing into a sequential table.

This combination requires that one router, R1, would be able to deduce those prefixes its neighboring router, R2 has and for which R1 is the next hop. Given the information exchanged between neighboring routers during the routing algorithm, it seems possible to add this information exchange. Notice, that this is necessary only in the pre-computation stage and only if we don't use the learning method.

2. A router that does not employ the distributed IP lookup method does not prevent other routers from using it. If a router participates in the distributed IP lookup then, as long as there is another upstream router that participates in the scheme then they may benefit each other.

Of course the closer the routers are the more they expect to help each other. A router R1 that uses the scheme may be directly connected to a router, R2 that does not use it. Router R2 simply ignores the clue and performs IP lookup in whatever way it prefers.

Router R1 also has to perform IP lookup in any standard way for packets received from R2. Moreover, the clue is good also at a distance. Even if the packet has traveled several hops since a clue was last added to it, the clue it carries is still a prefix of the packet destination and could save a distant router some of the processing.

The amount of savings depends on many factors, it could still be that the clue is the best matching prefix for the packet, or that the clue is much shorter than the BMP of the packet at the current router.

3. The distributed IP lookup scheme works well with any implementation of IP network layer. That is, it is easily integrated into IP routers of different vendors that co-exist in the same network today. It is quite possible that the 5 bits find their place in the current IP header, e.g., in the options field.

Sensitivity of Routing Information:

In many cases it could be that managers would hesitate to integrate the scheme since one router supposedly learns the prefixes of the other. Here we argue that this worry is not justified. Moreover, we show how it can be subdued.

(a) In the distributed IP lookup scheme, a router need to learn only those prefixes of its neighbor for which it is the next hop. These are prefixes of information that goes in its direction anyway. Any other prefix of its neighbor it will not learn and does not need.

(b) A router may either refrain from sending some clues (prefixes), or may truncate some clues. The scheme is still beneficial for the other clues. Truncated clues are also beneficial, perhaps not as much as the original.

Farther Improvements

Here we argue that the distributed IP lookup method can be used as a tool to balance the work load between routers. So far, the scheme was described as a mechanism that is added to the existing IP routing mechanisms and makes them work faster.

Here we use the IP routing tables together with the clue mechanism to shape the work load distribution along different paths in the network.

For example, let us guarantee that all the clues that may be sent from large back bone router R1 to its neighboring large router R2 are prefixes at R2 which may not be extended any farther. Then, router R2 performs IP lookup for each packet arriving from R1 in one memory reference, just as in TAG-switching (but does not need to swap the label/clue).

In a more aggressive implementation of this idea, one could shape the work load across the network. In such an approach, the work load of heavy traffic backbone routers is minimized while the peripheral and edge routers are required to gradually lookup for longer and longer prefixes.

Notice that aggregation was carefully implemented in the network in a way that does not create routing loops (over aggregation could potentially create such loops). However, our suggestion here is to amounts at reducing the aggregation rather than increasing it and hence may not create routing loops.

Another way by which we could make the clue scheme more efficient is by insisting that a clue is never removed from a clues' table (this requires a special marking for clues that are not valid). This makes the hash function stable and more efficient and minimizes the overhead due to topological changes.

A clue in the clues' table, which is not in use does not disturb, except for the space it consumes in the memory (which could be ignored if caching is used). Notice however that inactivating or activating a clue requires, in the Advance method, updates of other fields in the clues' table.

Integration with Different Data Structures

There are several different implementations of the lookup in current routers and in the literature. The distributed IP lookup method may work with either of them. However, our method may take further advantage of several of these methods when the lookup continues from the location pointed by the clue.

Figure 6:
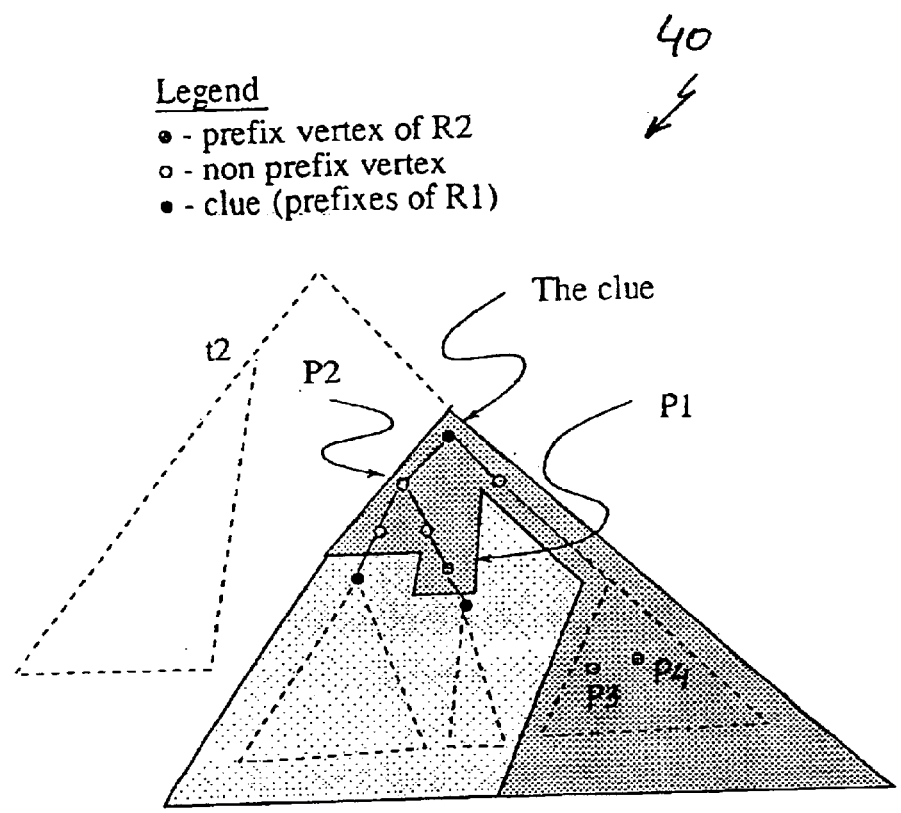
FIG. 6 shows another variant of the "advanced" method of the present invention.

As can be seen in FIG. 6 the space over which the lookup for a BMP should continue is restricted due to Argument 1. The potential prefixes in t2, the trie of R2, that may still be BMP's of the current packet, given the clue s, are those by which Argument 1 is violated, i.e.:

DEFINITION 1, condition C1: Any prefix p in t2, which:
1. Is a descendent of s; and,
2. Except for s there is no other prefix in t1 on the path from s top, might be a BMP of the current packet destination address.

In embodiment 40 of the present invention shown in FIG. 6, the prefixes over which the search continues when Argument 1 does not hold are in the shaded area.

Below we describe how different lookup techniques may be adapted to the special case of looking up a BMP given its clue s:

Adapting Patricia:

Let s to be the initial BMP. The lookup proceeds by simply walking on the Patricia trie from the clue s until the walk cannot continue as dictated by the sequence of bits in the destination address (because the corresponding branch is missing).

Notice, that automatically the walk never reaches a prefix which is also a prefix in t1 (otherwise, that prefix has been found by R1). The last prefix that was encountered by the walk is the desired BMP.

Notice too that we can further improve the search by applying Argument 1 to each vertex in the Patricia trie. We associate with each vertex a Boolean indicating whether the search should continue from this vertex or not (a knowledge that can be acquired by the application of Argument 1 to these vertices).

Whenever the search reaches a vertex from which it should not continue, the desired BMP is the last prefix that was encountered. If a router has several neighboring routers, then we have to add one such Boolean bit at each vertex for each neighboring router.

Adapting Binary Search:

The set of potential prefixes given a clue s that arrives from router R1 is denoted P(s,R1). The search for the BMP of the packet destination is performed using a standard binary search.

In general, the set P is expected to be small, e.g., to consist of just few prefixes. In such a case the entire set, may be placed in the same cache line with the clue's entry in the table (if we use SDRAM then each entry could contain few prefixes in addition to the other fields of an entry).

When the entry is fetched, the corresponding potential clues are brought into the cache line, and the appropriate prefix is found without any further external memory accesses. If however the set P is larger, then the 6-way approach suggested by B. Lampson et al., 1998, may be employed to expedite the search.

Adapting the Log W Method:

Given the set P it is possible to determine what is the minimum length and maximum length of a possible BMP in P. Given these lengths it is possible to adapt the method of M. Valdvogel et al., 1997, to perform a binary search over the possible BMP length.

In each step of the search we check for a given length i whether a string longer than the length i prefix of the destination address is a possible BMP. If so, we step forward according to the current step size in the binary search, and if not then either the length i prefix is the desired BMP, or we step backward according to the current step size in the binary search.

Empirical Tests

For the simulation of the distributed look up method, forwarding tables of five routers were employed: MAE-East, MAE-West, Paix, and two large neighboring routers in a large ISP. The total number of prefixes and clues of each of the routers are shown in Table 1–Table 3.

Tables 4–9, we compare the number of memory accesses (i.e., number of steps) required by different IP lookup methods. (To perform the experiments we took snapshots of the forwarding tables of the following routers at about the same time, either from Ipma ststistics.http:/nic.merit.edu/ipma, or using "sh ip route"): {MAE-East, MAE-West, Paix, and two large neighboring routers in a large ISP}.

The first three tables are route-server tables while the last two are actual forwarding tables. We then compared many different pairs of these routers (we used several other routers, but the results are similar to those reported here).

For each pair we simulated 10,000 packets with different destinations going from one router to the other. For each of these we counted the number of memory accesses (to a table or the trie) that are made at the receiving router.

The destination addresses for the experiments were selected as follows: Let R1 be the sending router and R2 the receiving router. A random destination is chosen, and its BMP in R1 is computed. Then we verified that this BMP is a vertex in the trie of R2, and if so the processing of that packet at R2 was carried out. If the BMP is not a vertex then this destination was not considered in our experiment.

This was done in order to predict for which selected destinations router R2 is a possible next hop. (Not all the routers we checked were immediate neighbors, and the knowledge of next hop was problematic, though the two routers of the ISP are immediate neighbors).

Certainly, eliminating these destinations from our experiments does not make our results look better. Since, if the BMP (which is the clue sent from R1 to R2) is not a vertex in the trie of R2 the clues' table immediately provides the desired lookup, at the minimum cost of one memory access (to the clues' table).

For each pair of routers we counted the average number of memory accesses performed by the 10,000 packets sent from one to the other under the following lookup schemes (see the tables).

Each of the experiments was repeated several times and the repeated results were extremely close to each other.

Methods Tested

Five basic methods for looking up a best matching prefix were considered:

Trie: In which is a bit by bit scan of the destination to find the matching point in the trie.
Patricia: See K. Sklower, 1992, and Leffler and Samuel .J et al. 1988, which is an efficient implementation of the trie.
Binary: See R. Perlman, 1992.
6-way: See B. Lampson et al. 1998, which is the same as the binary lookup but on the basis of 6-way branching rather than binary branching (Gupta et al. 1998),
Log W: See M. Valdvogel et al. 1997, which was described before.

We compared 15 different ways of performing the lookup: The basic five above without the clue, this set is called common in the tables. The simple method of the present invention combined with each of the above five methods, i.e., when a lookup has to be performed from the clue, the corresponding method was applied within the sub-tree rooted at the clue, and the Advance method of the present invention combined with each of the above five methods.

The most impressive result from all our experiments is that using the Advance method combined with any lookup scheme results in near optimal number of memory accesses, which is 1.

The minimum number of memory accesses is 1 since each IP lookup requires at least looking up the clue in the clues' table. This minimum also applies to IP/FAG-switching which also need at least to lookup the label in the labels' table.

The combinations of the Advance method with Patricia or the 6-way method are slightly better. The main reasons for the good results are first that the forwarding tables of neighboring routers are very similar, and furthermore Argument 1 applies to a vast majority of the clues sent from one to the other (95% to 99.5%).

Notice that the Advance method is about 22 times better than the simple trie scheme, and 3.5 times better than the Log W technique of M. Valdvogel et al. 1997. Moreover, the presented scheme is expected to give similar performances in IPv6 while the Log W technique does not scale as good, (assuming IPv6 uses aggregation similar to way IPv4 does). See B. Lampson et al. 1998.

Using the Simple method rather than the Advance method, we still get a considerable performance gain (about 10 times better than the common methods over e.g. Patrica, and about 50% improvement over the Log W).

Moreover, not only this scheme is more space efficient and simple to implement, it is also expected to scale nicely in IPv6.

Notice that the combination of the Advance method with Patricia (or trie) is better than its combination with Log W or the binary method. We believe the reason for that is that the former searches more locally while the later jumps all over the search space. This, together with the fact that the clue brings us close to the point where the search stops gives the combination with Patricia an advantage.

While the invention has been described with respect to a limited number of embodiments, it will be appreciated that many variations, modifications and other applications of the invention may be made.

TABLE 1

Total number of prefixes in each table.

| MAE-East | MAE-West | Paix | ISP-1 | ISP-2 | ISP-B-1 | ISP-B-2 |
|---|---|---|---|---|---|---|
| 42,250 | 24,123 | 5,974 | 23,414 | 60,475 | 56,034 | 55,959 |

TABLE 2

The total number of different clues that the sender may send and for which Claim 1 does not hold at the receiver. We call these kind of clues "problematic clues"

| Sender | Receiver | Problematic Clues |
|---|---|---|
| MAE-EAST | MAE-West | 288 |
| MAE-EAST | Paix | 35 |
| Paix | MAE-East | 411 |
| ISP-1 | ISP-2 | 575 |
| ISP-2 | ISP-1 | 52 |
| ISP-B-1 | ISP-B-2 | 66 |
| ISP-B-2 | ISP-B-1 | 38 |

TABLE 3

The total number of prefixes of one router that also appear in the other (i.e., the intersection Size).

| | | Equal Clues |
|---|---|---|
| MAE-EAST | MAE-West | 23,382 |
| MAE-EAST | Paix | 5,899 |
| MAE-WEST | Paix | 5,814 |
| ISP-1 | ISP-2 | 23,381 |
| ISP-B-1 | ISP-B-2 | 55,540 |

TABLE 4

Average number of memory accesses for packets processed by ISP-2 after being received from ISP-1.

| ISP-1 | Method | Trie | Patricia | Binary | 6-Way | LogW |
|---|---|---|---|---|---|---|
| ISP-2 | Common | 23.5899 | 20.7928 | 17 | 7 | 3.448 |
| | Simple | 2.0801 | 2.0565 | 2.1189 | 2.0456 | 3.0447 |
| | Advance | 1.0552 | 1.0442 | 1.0490 | 1.0190 | 1.0519 |

TABLE 5

Average number of memory accesses for packets processed by ISP-1 after being received from ISP-2.

| ISP-2 | Method | Trie | Patricia | Binary | 6-Way | LogW |
|---|---|---|---|---|---|---|
| ISP-1 | Common | 23.2410 | 18.8685 | 16 | 6 | 3.6339 |
| | Simple | 2.0583 | 2.0396 | 2.0947 | 2.0367 | 3.0566 |
| | Advance | 1.0011 | 1.0011 | 1.0011 | 1.0004 | 1.0029 |

TABLE 6

Average number of memory accesses for packets processed by ISP-B-2 after being received from ISP-B-1.

| ISP-B-1 | Method | Trie | Patricia | Binary | 6-Way | LogW |
|---|---|---|---|---|---|---|
| ISP-B-2 | Common | 23.7377 | 20.0929 | 17 | 7 | 3.3135 |
| | Simple | 2.0683 | 2.0467 | 2.1014 | 2.0393 | 3.0447 |
| | Advance | 1.0044 | 1.0031 | 1.0040 | 1.0015 | 1.0045 |

TABLE 7

Average number of memory accesses for packets processed by ISP-B-1 after being received from ISP-B-2.

| ISP-B-2 | Method | Trie | Patricia | Binary | 6-Way | LogW |
|---|---|---|---|---|---|---|
| ISP-B-1 | Common | 22.7328 | 20.1494 | 17 | 7 | 3.3272 |
| | Simple | 2.0746 | 2.0574 | 2.1223 | 2.0474 | 3.0543 |
| | Advance | 1.0025 | 1.0022 | 1.0024 | 1.0009 | 1.0026 |

TABLE 8

Average number of memory accesses for packets processed by Router MAE-East and MAE-West after being received from Paix.

| Paix sends clue to | Method | Trie | Patricia | Binary | 6-Way | LogW |
|---|---|---|---|---|---|---|
| MAE-East | Common | 22.5483 | 19.7820 | 17 | 7 | 3.4705 |
| | Simple | 2.0647 | 2.0436 | 2.0897 | 2.0347 | 3.0387 |
| | Advance | 1.0617 | 1.0497 | 1.0590 | 1.0228 | 1.0599 |
| MAE-West | Common | 22.553 | 19.0658 | 16 | 7 | 3.5063 |
| | Simple | 2.0476 | 2.0336 | 2.0732 | 2.0283 | 2.0356 |
| | Advance | 1.0391 | 1.0320 | 1.0394 | 1.0152 | 1.0445 |

TABLE 9

Average number of memory accesses for packets processed by Router MAE-West and Paix after being received from MAE-East.

| MAE-East sends clue to | Method | Trie | Patricia | Binary | 6-Way | LogW |
|---|---|---|---|---|---|---|
| MAE-West | Common | 22.7288 | 19.0678 | 16 | 7 | 3.5295 |
| | Simple | 2.0500 | 2.0367 | 2.0367 | 2.0150 | 3.0471 |
| | Advance | 1.0070 | 1.0057 | 1.0069 | 1.0026 | 1.0073 |
| Paix | Common | 22.4478 | 17.2646 | 14 | 6 | 3.5277 |
| | Simple | 2.0544 | 2.0404 | 2.0924 | 2.0358 | 3.0508 |
| | Advance | 1.0097 | 1.0090 | 1.0114 | 1.0044 | 1.0097 |

What is claimed is:

1. A method for routing a data packet from a forwarding router to a downstream router comprising the steps of:

(a) providing the data packet with a header including an address, said address including at least one bit string;

(b) providing the forwarding router with a database including a plurality of prefixes;

(c) looking up, via a first data structure in said database of the forwarding router, said prefix that best matches said bit string of said address of the data packet;

(d) attaching a clue that is related to said best matching prefix to the data packet;

(e) providing the downstream router with a database including a plurality of prefixes;

(f) forwarding the data packet with said clue by the forwarding router to the downstream router; and, (g) looking up, via a second data structure in said database of the downstream router, said prefix that best matches said bit string of said address of the data packet, said looking up being effected with reference to said clue.

2. A method as in claim 1 wherein said attaching of said clue includes the writing of said clue into said header of the data packet.

3. A method as in claim 1 wherein said address of the data packet is selected from a group consisting of destination address of the data packet, source address of the data packet, destination port of the data packet, source port of the data packet and protocol of the data packet.

4. The method as in claim 1 wherein the forwarding router serves as a routing device in a network selected from the group consisting of TCP-IP, MPLS and Tag-switching.

5. A method as in claim 1 wherein said clue is selected from the group consisting of
(i) a bit string of said prefix of said forwarding router that best matches said bit string of said address of the data packet,
(ii) a number of bits in said bit string of said best matching prefix and
(iii) a prefix associated with a point in said first datastructure of said forwarding router in which said looking up was terminated.

6. A method as in claim 1 wherein said looking up via said first data structure is effected by a method selected from the group consisting of Trie lookup, Patricia, binary search, 6 way search and fast binary search.

7. A method as in claim 1 wherein said looking up via said second data structure is effected by a method selected from the group consisting of Trie lookup, Patricia, binary search, 6 way search and fast binary search.

8. A method as in claim 1 further comprising the step of:
(h) deciding according to said clue, whether to continue said looking up in said second data structure of said downstream router.

9. A method as in claim 8 wherein said deciding precedes said looking up in said second data structure.

10. The method as in claim 8 wherein; if said decision is positive, said looking up begins at a vertex in said second data structure.

11. The method as in claim 10 wherein said vertex is associated with a binary string identical to a bit string of said prefix in forwarding router that best matches said bit string of said address of the data packet.

12. The method as in claim 10 further comprising the step of:
(i) if said looking up fails, assigning one of said prefixes in said second database as a best matching prefix to said address.

13. The method as in claim 12 wherein said one assigned prefix is selected from the group consisting of
(i) said clue,
(ii) a prefix in a prefixed vertex representing said clue and
(iii) a prefix in a prefixed vertex which is a nearest ancestor to a vertex representing said clue.

14. The method as in claim 8 further comprising the step of:
(i) if said decision is negative, choosing one of said prefixes in said second data base of said downstream router to represent a best matching prefix to said address of the data packet.

15. The method as in claim 14 wherein said one chosen prefix is selected from the group consisting of
(i) said clue,
(ii) a prefix in a prefixed vertex representing said clue and
(iii) a prefix in a prefixed vertex which is a nearest ancestor to a vertex representing said clue.

16. The method as in claim 1 further comprising the steps of:
(j) constructing a hash table in the downstream router, said hash table including an indexed list of possible clues that the downstream router may receive.

17. The method as in claim 16 wherein each entry of said indexed list including:
(i) a pointer field; and
(ii) a final decision field.

18. The claim 17 wherein said list of said possible clues is prepared prior to said forwarding.

19. A method of routing a plurality of data packets from a forwarding router to a downstream router, comprising the steps of:
(a) providing each data packet with a header including an address, said address including at least one bit string;
(b) providing the forwarding router with a forwarding database including a plurality of prefixes;
(c) for each data packet:
(i) looking up, in said forwarding database, said prefix that best matches said bit string of said address of said each data packet, and
(ii) attaching to said each data packet a clue that is related to said best matching prefix;
(d) providing the downstream router with a downstream database including a plurality of prefixes; and
(e) for each data packet:
(i) forwarding said each packet with said clue thereof by the forwarding router to the downstream router; and
(ii) looking up, in said downstream database, a prefix that best matches said bit string of said address of said each data packet, said looking up being effected with reference to said clue of said each data packet.

20. The method of claim 19, further comprising the step of:
(f) constructing a hash table in the downstream router, said hash table including an indexed list of possible clues that the downstream router may receive.

21. The method of claim 20, wherein each entry in said list includes:
(i) a pointer field, and
(ii) a final decision field.

22. The method of claim 20, further comprising the step of:
(g) for each data packet: subsequent to said forwarding, updating said hash table, based on said clue of said each data packet.

23. The method of claim 22, wherein said updating is effected by steps including processing said clue of said each data packet with a hash function.

24. A method of routing a plurality of data packets from d forwarding routers, d being an integer greater than one, to a downstream router, each data packet being routed from a respective forwarding router to the downstream router, the method comprising the steps of:

(a) providing each data packet with a header including an address, said address including at least one bit string;

(b) providing each forwarding router with a respective forwarding database including a plurality of prefixes;

(c) for each data packet:
  (i) looking up, in said respective forwarding database, said prefix that best matches said bit string of said address of said each data packet, and
  (ii) attaching to said each data packet a clue that is related to said best matching prefix;

(d) providing the downstream router with a downstream database including a plurality of prefixes; and (e) for each data packet:
  (i) forwarding said each data packet with said clue thereof by the respective forwarding router to the downstream router; and
  (ii) looking up, in said downstream database, a prefix that best matches said bit string of said address of said each data packet, said looking up being effected with reference to said clue of said each data packet.

25. The method of claim 24, further comprising the step of:

(f) for each forwarding router, constructing a respective hash table in the downstream router, said hash table including an indexed list of possible clues that the downstream router may receive from said each forwarding router.

26. The method of claim 24, further comprising the step of:

(f) constructing a common hash table in the downstream router, said common hash table including an indexed list of possible clues that the downstream router may receive from any of the forwarding routers.

27. The method of claim 26 wherein said hash table includes a bitmap of size d, each bit in said bitmap being a lookup flag in said downstream router.

28. The method of claim 27 further comprising the steps of:

(g) upon receipt of said clue in one of said data packets;
  (i) reading said bit in said bitmap which corresponds to said respective forwarding router of said one data packet
  (ii) routing said one data packet in accordance with said bit.

29. The method of claim 26 further comprising the steps of:

(g) for each forwarding router, constructing a respective hash table in the downstream router, said respective hash table including an indexed list of possible clues that the downstream router may receive from said each forwarding router.

30. A method of routing a plurality of data packets from a forwarding router to a downstream router in a MPLS network, comprising the steps of:

(a) providing each data packet with a header including an address, said address including at least one bit string;

(b) providing the forwarding router with a forwarding database including a plurality of prefixes; and (c) for each data packet:
  (i) looking up, in said forwarding database, said prefix that best matches said bit string of said address of said each data packet;
  (ii) providing data packets having same said best matching prefixes, a label; and
  (iii) attaching to said each data packet a clue that is related to said best matching prefix;
  (iv) providing the downstream router with a downstream database including a plurality of prefixes;
  (v) forwarding said each data packet with said clue by the forwarding router to the downstream router; and
  (vi) looking up, in said downstream database, said prefix that best matches said bit string of said address of said each data packet, said looking up being effected with reference to said clue.

31. The method of claim 30 wherein said clue includes said label.

32. A method of routing a plurality of data packets from a forwarding router to a downstream router in a Tag-Switching network, comprising the steps of:

(a) providing each data packet with a header including an address, said address including at least one bit string;

(b) providing the forwarding router with a forwarding database including a plurality of prefixes; and (c) for each data packet:
  (i) looking up, in said forwarding database, said prefix that best matches said bit string of said address of said each data packet,
  (ii) providing data packets having same said best matching prefixes, a tag; and
  (iii) attaching to said each data packet a clue that is related to said best matching prefix;
  (iv) providing the downstream router with a downstream database including a plurality of prefixes;
  (v) forwarding said each data packet with said clue by the forwarding router to the downstream router; and
  (vi) looking up, in said downstream database, said prefix that best matches said bit string of said address of said each data packet, said looking up being effected with reference to said clue.

33. The method of claim 32 wherein said clue includes said tag.

* * * * *